(12) United States Patent
Kurakata

(10) Patent No.: US 8,837,022 B2
(45) Date of Patent: Sep. 16, 2014

(54) IMAGE READER, IMAGE FORMING APPARATUS, AND METHOD OF CORRECTING OUTPUT VALUES

(75) Inventor: Takahiro Kurakata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 233 days.

(21) Appl. No.: 13/311,849

(22) Filed: Dec. 6, 2011

(65) Prior Publication Data

US 2012/0162729 A1 Jun. 28, 2012

(30) Foreign Application Priority Data

Dec. 27, 2010 (JP) ................................ 2010-290536

(51) Int. Cl.
*G03F 3/00* (2006.01)
*H04N 1/40* (2006.01)
*H04N 1/203* (2006.01)
*H04N 1/409* (2006.01)
*H04N 1/407* (2006.01)
*H04N 1/00* (2006.01)
*H04N 1/12* (2006.01)
*H04N 1/193* (2006.01)

(52) U.S. Cl.
CPC ........... *H04N 1/4072* (2013.01); *H04N 1/2032* (2013.01); *H04N 1/12* (2013.01); *H04N 1/193* (2013.01); *H04N 1/4095* (2013.01); *H04N 1/00716* (2013.01)
USPC ............ 358/518; 358/504; 358/474; 358/448

(58) Field of Classification Search
USPC .......... 358/1.1, 1.9, 3.26, 474, 501, 504, 521, 358/522
See application file for complete search history.

(56) References Cited

U.S. PATENT DOCUMENTS

| 5,119,211 | A | * | 6/1992 | Sakurai | 358/448 |
|---|---|---|---|---|---|
| 8,031,381 | B2 | * | 10/2011 | Yotsuyanagi | 358/518 |
| 8,164,809 | B2 | * | 4/2012 | Ohkawa | 358/518 |
| 8,243,333 | B2 | * | 8/2012 | Tamura | 358/2.1 |
| 8,405,869 | B2 | * | 3/2013 | Harigai | 358/1.9 |
| 2005/0157319 | A1 | * | 7/2005 | Mizuhashi et al. | 358/1.9 |
| 2008/0007801 | A1 | * | 1/2008 | Yotsuyanagi | 358/500 |
| 2008/0180706 | A1 | | 7/2008 | Yanagi | |
| 2009/0161124 | A1 | * | 6/2009 | Tamura | 358/1.1 |
| 2010/0271671 | A1 | * | 10/2010 | Shoda et al. | 358/488 |
| 2013/0135700 | A1 | * | 5/2013 | Tamura | 358/530 |
| 2013/0170003 | A1 | * | 7/2013 | Yabuuchi | 358/498 |

FOREIGN PATENT DOCUMENTS

| JP | 2008187466 A | 8/2008 |
|---|---|---|
| JP | 2009232289 A | 10/2009 |

* cited by examiner

*Primary Examiner* — Kimberly A Williams
(74) *Attorney, Agent, or Firm* — Harness, Dickey & Pierce, P.L.C.

(57) ABSTRACT

Disclosed is an image reader including a first reading unit that reads an image on a front surface of an object placed on a first background member to output a first output value; a second reading unit that reads an image on a back surface of the object placed on a second background member which is different from the first background member to output a second output value; a ground output detecting unit that detects first and second ground output values based on the first and second output values, respectively; a thickness calculating unit that calculates the thickness of the object based on an output ratio between the first ground output value and the second ground output value; and an output correction unit that corrects the first and second output values based on the calculated thickness of the object.

17 Claims, 18 Drawing Sheets

FIG.13

| CORRECTION TABLE | | | |
|---|---|---|---|
| OUTPUT RATIO (%) | THICKNESS [g/m$^2$] | FRONT SURFACE CORRECTION FACTOR | BACK SURFACE CORRECTION FACTOR |
| ~96 | ~52 | $\alpha(1)$ | $\beta(1)$ |
| 96~97 | 52~56 | $\alpha(2)$ | $\beta(2)$ |
| 97~98 | 56~61 | $\alpha(3)$ | $\beta(3)$ |
| 98~99 | 61~70 | $\alpha(4)$ | $\beta(4)$ |
| 99~100 | 70~100 | $\alpha(5)$ | $\beta(5)$ |

FIG.14

| FRONT | | | |
|---|---|---|---|
| THICKNESS [g/m$^2$] | Red | Green | Blue |
| 50 | 33.7 | 31.7 | 34.6 |
| 60 | 33.5 | 32.4 | 34.1 |
| 70 | 33.4 | 32.9 | 33.7 |
| 80 | 33.4 | 33.1 | 33.5 |
| 90 | 33.3 | 33.3 | 33.4 |

UNIT [%]

FIG.19

| OUTPUT RATIO (%) | THICKNESS [g/m²] | FRONT SURFACE CORRECTION FACTOR | BACK SURFACE CORRECTION FACTOR | FRONT SURFACE COLOR CONVERSION MATRIX | BACK SURFACE COLOR CONVERSION MATRIX |
|---|---|---|---|---|---|
| ~96 | ~52 | α(1) | β(1) | A(1) | B(1) |
| 96~97 | 52~56 | α(2) | β(2) | A(2) | B(2) |
| 97~98 | 56~61 | α(3) | β(3) | A(3) | B(3) |
| 98~99 | 61~70 | α(4) | β(4) | A(4) | B(4) |
| 99~100 | 70~100 | α(5) | β(5) | A(5) | B(5) |

US 8,837,022 B2

IMAGE READER, IMAGE FORMING APPARATUS, AND METHOD OF CORRECTING OUTPUT VALUES

BACKGROUND OF THE INVENTION

1. Field of the Invention

The present invention relates to an image reader, an image forming apparatus and a method of correcting output values and more specifically, to an image reader of a duplex scanning type that reads both sides of a target to be read, an image forming apparatus including such an image reader and a method of correcting output values output in such an image reader.

2. Description of the Related Art

As for a duplex scanning type image reader, a first reading unit (a reading unit for reading an image on a front surface of a document, for example) having a movable reading section (a movable mirror unit or the like) and a second reading unit of a fixed contact type (a reading unit for reading an image on a back surface of the document, for example) are used as reading means in many cases. In such a case, because of the reason of transfer of the document or generation of shading data, different background members are used for the first reading unit and the second reading unit. For example, there is a case where a guide board or a transfer belt is used for the background member of the first reading unit and a white board roller is used for the background member of the second reading unit.

However, there exists a difference in shading between read images respectively read by the first reading unit and the second reading unit even when a same document is read when the different background members are used for the first reading unit and the second reading unit because of the influence of the background members when reading the document. Especially, for an achromatic document, there is a problem that the images seem to have different colors even with slightly different shades.

As for such a problem, it is disclosed in Japanese Laid-open Patent Publication NO. 2008-187466, for example, that an image reader itself outputs a color correction chart of total colors or a specified color as a reference, and corrects colors of read images of both sides read by a first reading means for reading a front surface of a document and a second reading means for reading a back surface of a document based on read images obtained by reading the color correction chart by the first reading means and the second reading means.

However, when the document is thin, the influence of the background members becomes large while when the document is thick, the influence is not large. According to the technique disclosed in Japanese Laid-open Patent Publication No. 2008-187466, such a difference in thickness of the read document is not considered, and when the color chart is formed on a thin document, read images respectively read by the first reading means and the second reading means have difference in shading because of the influence of the background members and appropriate correction cannot be performed.

SUMMARY OF THE INVENTION

The present invention is made in light of the above problems, and may provide a technique where a difference in shading of images of both sides because of an influence of background members can be avoided even when different background members are used for a first reading unit for reading one side of a document and a second reading unit for reading the other side of a document.

The present invention has been made based on the knowledge the inventors have thus obtained and has the following configurations.

According to an embodiment, there is provided an image reader including a first reading unit that includes a first background member and reads an image on a front surface of an object to be read placed on the first background member to output a first output value; a second reading unit that includes a second background member and reads an image on a back surface of the object placed on the second background member to output a second output value, the second background member being different from the first background member; a ground output detecting unit that detects a first ground output value that expresses an output value for a ground part of the front surface based on the first output value output by the first reading unit and a second ground output value that expresses an output value for a ground part of the back surface based on the second output value output by the second reading unit; a thickness calculating unit that calculates the thickness of the object based on an output ratio between the first ground output value and the second ground output value; and an output correction unit that corrects the first output value output by the first reading unit and the second output value output by the second reading unit based on the calculated thickness of the object, to output a corrected first output value and a corrected second output value, respectively.

According to another embodiment, there is provided an image forming apparatus including the above image reader and forming an image based on the first corrected output value and the second corrected output value output from the image reader.

According to another embodiment, there is provided a method of correcting output values output from a first reading unit that includes a first background member and reads an image on a front surface of an object to be read placed on the first background member to output a first output value, and a second reading unit that includes a second background member and reads an image on a back surface of the object placed on the second background member to output a second output value, the second background member being different from the first background member, the method including: detecting a first ground output value that expresses an output value for a ground part of the front surface based on the first output value output by the first reading unit and a second ground output value that expresses an output value for a ground part of the back surface based on the second output value output by the second reading unit; calculating the thickness of the object based on the output ratio between the first ground output value and the second ground output value; and correcting the first output value output by the first reading unit and the second output value output by the second reading unit based on the calculated thickness of the object, to output a corrected first output value and a corrected second output value, respectively.

According to another embodiment, there is provided an image reader including: a first reading means, including a first background member, for reading an image on a front surface of an object to be read placed on the first background member to output a first output value; a second reading means, including a second background member, for reading an image on a back surface of the object placed on the second background member to output a second output value, the second background member being different from the first background member; a ground output detecting means for detecting a first ground output value that expresses an output value for a ground part of the front surface based on the first output value output by the first reading means and a second ground output value that expresses an output value for a ground part of the back surface based on the second output value output by the second reading means; a thickness calculating means for calculating the thickness of the object based on an output ratio between the first ground output value and the second ground output value; and an output correction means for correcting the first output value output by the first reading means and the second output value output by the second reading means based on the calculated thickness of the object, to output a corrected first output value and a corrected second output value, respectively.

BRIEF DESCRIPTION OF THE DRAWINGS

Other objects, features and advantages of the present invention will become more apparent from the following detailed description when read in conjunction with the accompanying drawings.

FIG. 13 is a table showing an example of correction table;

FIG. 14 is a table showing a part of the values of the characteristic of ratios of RGB components corresponding to the graph shown in FIG. 7;

FIG. 19 is a table showing an example of a correction table including color conversion matrixes corresponding to each of the correction factors;

DETAILED DESCRIPTION OF THE PREFERRED EMBODIMENTS

Figure 1:
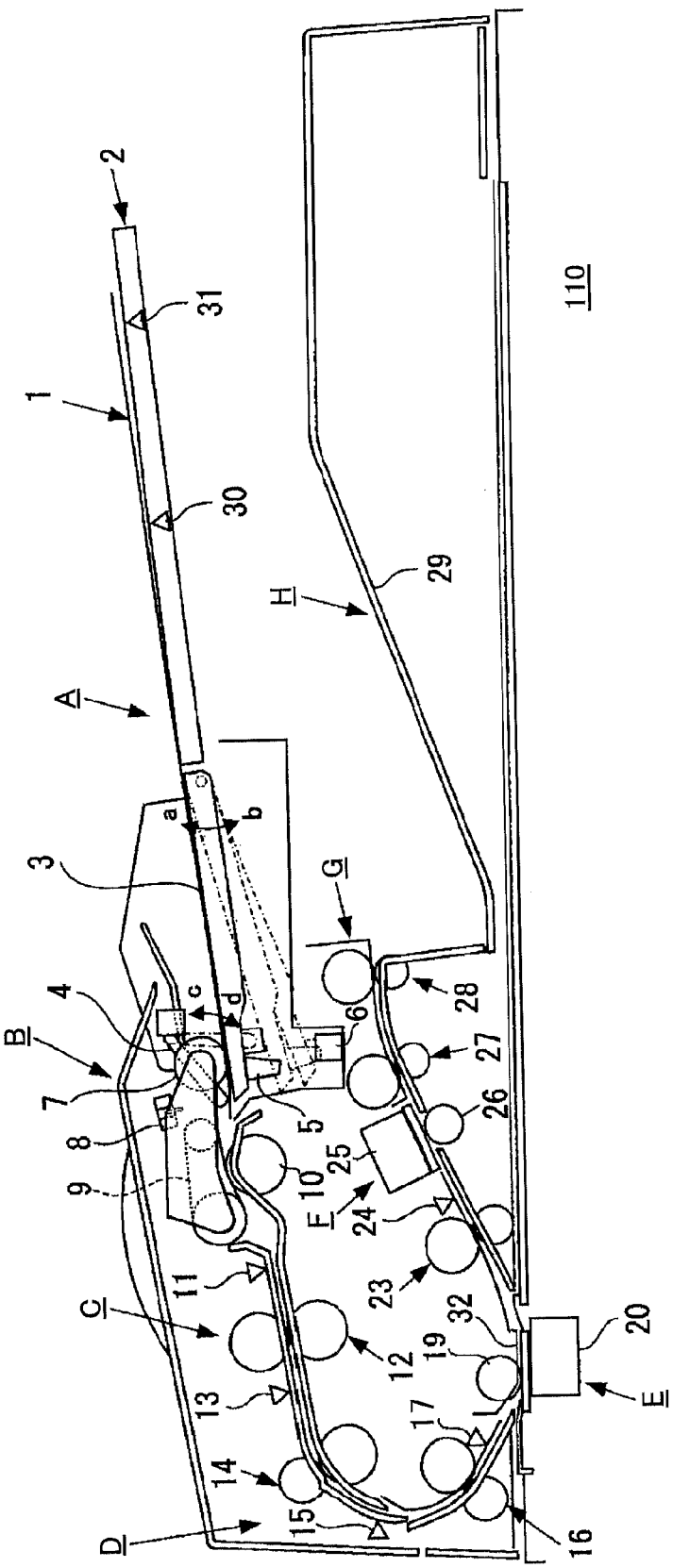
FIG. 1 is a drawing showing an example of a mechanical part of an image reader according to an embodiment.

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Next, embodiments of the present invention will be described below with reference to drawings.

It is to be noted that, in the explanation of the drawings, the same components are given the same reference, numerals, and explanations are not repeated.

When reading a front surface and a back surface of a document with a first reading unit and a second reading unit, respectively, lights incident on sensors respectively composing the first reading unit and the second reading unit include (1) a reflected light from the document and
(2) a reflected light from a background member.

Even when different background members are used for the first reading unit and the second reading unit, the reflected lights from the document incident on the sensors of the first reading unit and the second reading unit are the same.

However, the amounts of the reflected lights from the background members differ for the first reading unit and the second reading unit because of an influence of spectral characteristics of the used background members. When the document becomes thinner, the ratio of the reflected light from the background member increases to decrease the ratio of the reflected light from the document. When the spectral characteristics of the used background members are different, there may be a difference in shading between images of a front surface and a back surface because of the influence of the background members when a thin document is used.

In the following embodiment, simultaneous duplex scanning of reading both sides of a document at the same time is performed. In such an operation, output values of read images become lower as the document (not limited to a paper though) becomes thinner because amounts of light that pass through the document increase. However, decreasing amounts, or decreasing manners, differ for the output values of the front surface and the back surface because of the difference in the reflected lights due to the background members as explained above.

It means that an output ratio between a first output value output by the first reading unit that reads an image on a front surface and a second output value output by the second reading unit that reads an image on a back surface varies depending on the thickness of the read document. In the following embodiment, therefore, the thickness of the document is specified by an output ratio between the first output value and the second output value, respectively read by the first reading unit and the second reading unit and then the first output value and the second output value are corrected using correction factors for removing the influence of the background members at the respective thickness.

The background members for the first reading unit and the second reading unit may be composed of different materials and may have shadings different from each other.

In this embodiment, an example is explained where an image reader has a function of an auto document feeder (ADF) by which a document is to be read, and an object (hereinafter simply referred to as a "document") is transferred to a fixed reading unit and read while being transferred at a predetermined speed.

The image reader may be stand-alone or may be connected to an image forming apparatus such as a digital multifunction apparatus, a digital copier, a facsimile machine or the like via a network. In this embodiment, the image reader is connected to an image forming apparatus via a network.

The structure of the image reader according to the embodiment will be explained with reference to FIG. 1 and FIG. 2.

FIG. 1 is a drawing showing an example of a mechanical part of the image reader 110 according to the embodiment.

Figure 2:
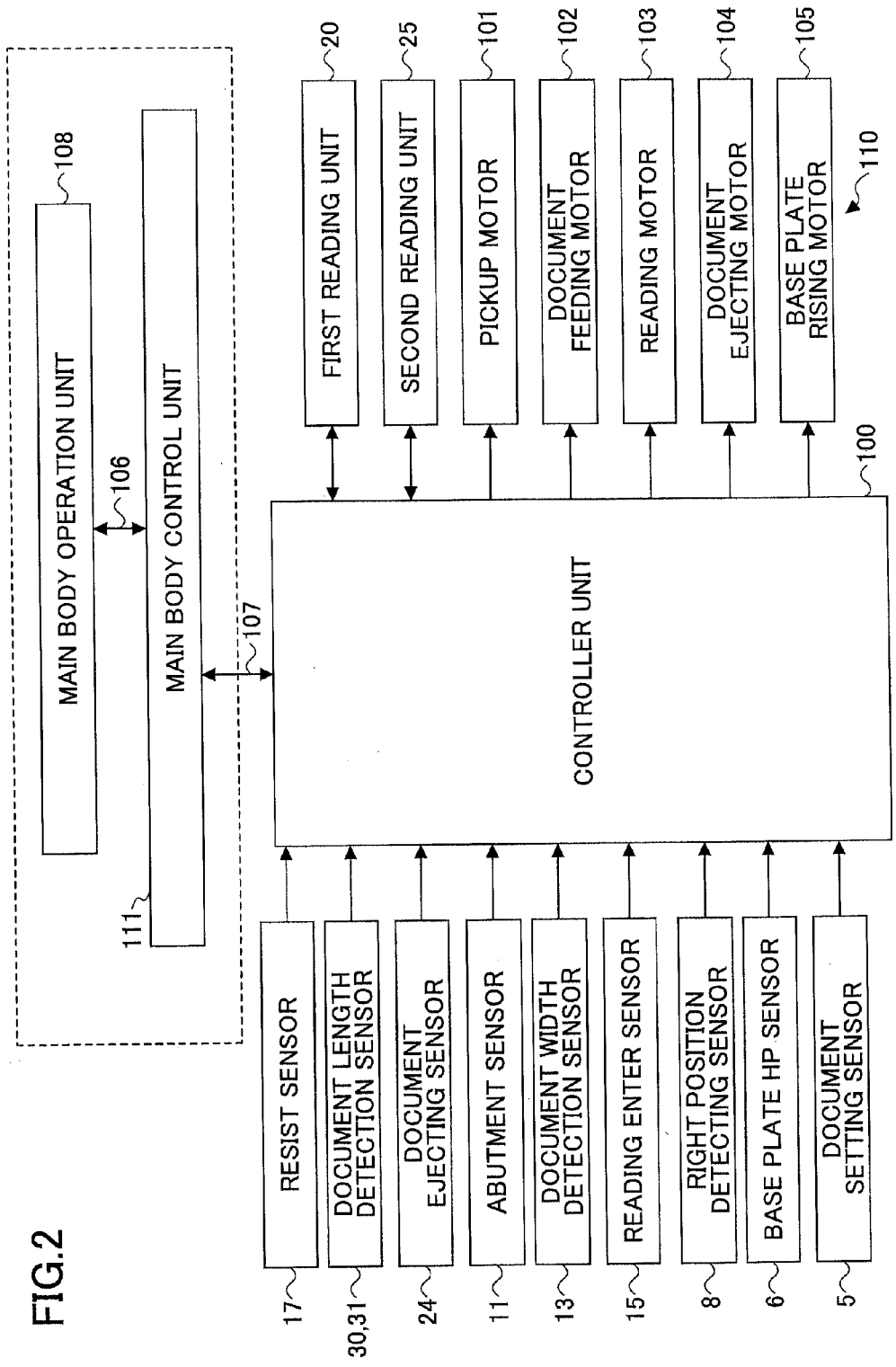
FIG. 2 is a block diagram showing an example of a functional structure of the controllers of the image reader according to the embodiment.

FIG. 2 is a block diagram showing an example of a functional structure of the controllers of the image reader 110.

The image reader 110 includes a document setting unit A for setting documents, a separately feeding unit B, a resist unit C, a turn unit D; a first reading and transferring unit E, a second reading and transferring unit F, a document ejecting unit G, a stacking unit H, drive units (motors) 101 to 105, and a controller unit 100.

Referring to FIG. 2, the controller unit 100 communicates with a main body control unit 111 of a main body via an interface (hereinafter referred to as I/F as well) 107. The main body further includes a main body operation unit 108 that is connected with the main body control unit 111 via an interface (hereinafter referred to as I/F as well) 106.

Referring to FIG. 1, the separately feeding unit B individually feeds each of documents by separating the document from a set bundle of the documents 1. The resist unit C contacts the thus fed document to primarily align and further transfers the document. The turn unit D turns the thus transferred document to have one side of the document (a surface where an image exists if the document has the image only on one side, and one of the surfaces if the document has the images on both sides) face a reading side (downward) and further transfers the document.

The first reading and transferring unit E reads a surface image on the one side of the document from the lower side of a contact glass. The second reading and transferring unit F reads a surface image on the other side of the document (when the document has the images on both sides) after the image on the one side is read. The document ejecting unit G ejects the document, for which the reading operation for the one side or the both sides is completed, outside. The stacking unit H holds the document for which the reading operation is completed in a stacked manner. The drive units (motors) 101 to 105 drive the components to perform the above operations. The controller unit 100 controls the series of the operations.

The bundle of documents 1 of documents to be read is set on a document table 2 including a movable document table 3 of the document setting unit A. In this case, it is assumed that a user sets the bundle of documents 1 with a side (one of the sides when the document has the images on both sides) on which an image is on facing upward.

Further, position of the bundle of documents 1 in a width direction (perpendicular to the transferring direction) may be set by a side guide (not shown in the drawings). Setting of the documents is detected by a set filler 4 and a document setting sensor 5. The controller unit 100 sends a signal (hereinafter simply referred to as a detecting signal as well) indicating the detection of the setting of the documents to the main body control unit 111 via the interface 107.

Further, the approximate length of the document is detected by document length detection sensors 30 and 31 attached to a table surface of the document table 2. The document length detection sensors 30 and 31 may be reflection type sensors or actuator type sensors that can detect the length of a document even when a single document is set. In order to detect the length of the document, the sensors 30 and 31 may be provided at multiple positions capable of detecting the set directions of all sizes of the documents.

The movable document table 3 is movable by a base plate rising motor 105 in upward and downward directions as shown by arrows a and b in FIG. 1. When the movable document table 3 is positioned at home position (HP), a base plate HP sensor 6 detects the movable document table 3.

When the set filler 4 and the document setting sensor 5 detect the setting of the documents, the controller unit 100, upon receiving the detecting signal, controls the base plate rising motor 105 to rotate in a forward direction to raise the movable document table 3 until the topmost part of the bundle of documents 1 touches a pickup roller 7.

The pickup roller 7 is moved in directions shown by arrows c and d in FIG. 1 by a cam mechanism of a pickup motor 101. Further, the pickup roller 7 is pushed by the upper surface of the documents on the movable document table 3 when the movable document table 3 moves upward. The upper limit of the pickup roller 7 can be detected by a right position detecting sensor 8.

When a print key on the main body operation unit 108 of the main body operation unit 108 is pressed, the instruction is sent to the main body control unit 111 via the I/F 106. The instruction is then sent to the controller unit 100 from the main body control unit 111 via the I/F 107 as a document feeding signal. Then, the pickup roller 7 is driven to rotate by the rotation of a document feeding motor 102 in a forward direction to pick up a few (hopefully one) of the documents on the document table 2. The rotating direction of the pickup roller 7 is a direction so that the topmost document is transferred to the feeding position.

A document feeding belt 9 is driven in a feeding direction by a forward rotation of the document feeding motor 102, while a reverse roller 10 of the separately feeding unit B is driven to rotate in the reverse direction of the feeding direction by the forward rotation of the document feeding motor 102 to separate the topmost document from the rest of the documents to feed only the topmost document.

More in detail, the reverse roller 10 contacts the document feeding belt 9 at a predetermined pressure to actualize the following operation. When the reverse roller 10 directly contacts the document feeding belt 9 or contacts the document feeding belt 9 with only a single interposed document, the reverse roller 10 rotates counterclockwise in accordance with the rotation of the document feeding belt 9. On the other hand, as the rotation force of the reverse roller 10 in the counterclockwise direction in accordance with the rotation of the document feeding belt 9 is set to become lower than the torque of the torque limiter when two or more documents are inserted between the reverse roller 10 and the document feeding belt 9, the reverse roller 10 rotates clockwise, its original forward direction, to move back the extra documents for avoiding multi feeding.

The separated single document by the operation of the document feeding belt 9 and the reverse roller 10 is further transferred by the document feeding belt 9 so that an abutment sensor 11 of the resist unit C detects the front edge of the document. Then, the document is further transferred to touch a halt pull-out roller 12. The document is transferred predetermined distance from the point where the document is detected by the abutment sensor 11 to stop the document feeding motor 102 and be in contact with the pull-out roller 12 in a deformed manner. At this time, the operation of the document feeding belt 9 is terminated to cause a standby state.

At this time, by rotating the pickup motor 101, the pickup roller 7 is removed from the upper surface of the document so that the document is transferred only by a force of the document feeding belt 9 to have the front edge of the document be inserted at a nip of a pair of up and down rollers of the pull-out roller 12 to be aligned (skew correction).

The pull-out roller 12 has a function to transfer the thus aligned document to a middle roller 14 in addition to the function of aligning the front edge of the document. The pull-out roller 12 is driven by the rotation of the document feeding motor 102 in the reverse direction. While the document feeding motor 102 is rotated in the reverse direction at this time, although the pull-out roller 12 and the middle roller 14 are driven, the pickup roller 7 and the document feeding belt 9 are not driven.

Plural of document width detection sensors 13 are aligned in a depth direction of FIG. 1 to detect a size of the document in a width direction (main scanning direction) perpendicular to the transfer direction (sub scanning direction).

The length of the document in the transferring direction is detected by detecting the front and back edges of the document with the abutment sensor 11 and counting the output pulses from the document feeding motor 102 output between the time when the front edge is detected and the time when the back edge is detected.

When the document is transferred from the resist unit C to the turn unit D by the operation of the pull-out roller 12 and the middle roller 14, the transferring speed of the document at the resist unit C is set faster than that at the first reading and transferring unit E in order to shorten the time necessary for transferring the document to the first reading and transferring unit E.

When the front edge of the document is detected by a reading enter sensor 15, the transferring speed of the document is slowed so that the transferring speed becomes equal to the reading speed before the front edge of the document is inserted at a nip of a pair of up and down rollers of a reading enter roller 16 and at the same time, a reading motor 103 is rotated in a forward direction to drive the reading enter roller 16, a first reading roller 19, a reading exit roller 23, a second reading roller 26, and a CIS exit roller 27.

When a resist sensor 17 detects the front edge of the document, the controller unit 100 slows the transferring speed of the document to be suspended just before the reading position by a first reading unit 20 during a predetermined distance. At the same time, the controller unit 100 sends a signal indicating the resist suspension to the main body control unit 111 via the I/F 107.

Subsequently, when the controller unit 100 receives a signal indicating starting of the reading from the main body control unit 111, the suspended document is transferred with its speed increasing so that the feeding speed becomes a predetermined speed when the front edge reaches the reading position of the first reading unit 20.

At the timing when the front edge of the document reaches the reading position of the first reading unit 20 detected by counting output pulses of the reading motor 103, the controller unit 100 starts sending a gate signal indicating the effective image area in the sub scanning direction of the first surface (front surface) of the document to the main body control unit 111. The gate signal is continuously sent to the main body control unit 111 until the back edge of the document passes the reading position of the first reading unit 20.

When only the image of one side of the document is to be read, the document that has passed the first reading and transferring unit E is transferred to the document ejecting unit G through a second reading unit 25 of the second reading and transferring unit F. At this time, when the controller unit 100 detects the front edge of the document with a document ejecting sensor 24, a document ejecting roller 28 is rotated by rotating a document ejecting motor 104 in its forward direction. Further, by counting output pulse from the document ejecting motor 104 from the time when the front edge is detected by the document ejecting sensor 24, the transferring speed of the document is slowed just before the back edge of the document passes through a nip of a pair of up and down rollers of a document ejecting roller 28 so that a document ejected on a paper-catch tray 29 composing the stacking unit H, is controlled not to burst out from the paper-catch tray 29.

When both sides of the document are to be read, the controller unit 100 counts output pulses by the reading motor 103 after the front edge of the document is detected by the document ejecting sensor 24 so that the controller unit 100 starts sending gate signal indicating the effective image area in the sub scanning direction of the second surface (back surface) of the document to the main body control unit 111 at the timing when the front edge of the document reaches the reading position of the second reading unit 25. The gate signal is continuously sent to the main body control unit 111 until the back edge of the document passes the reading position of the second reading unit 25.

Figure 21:
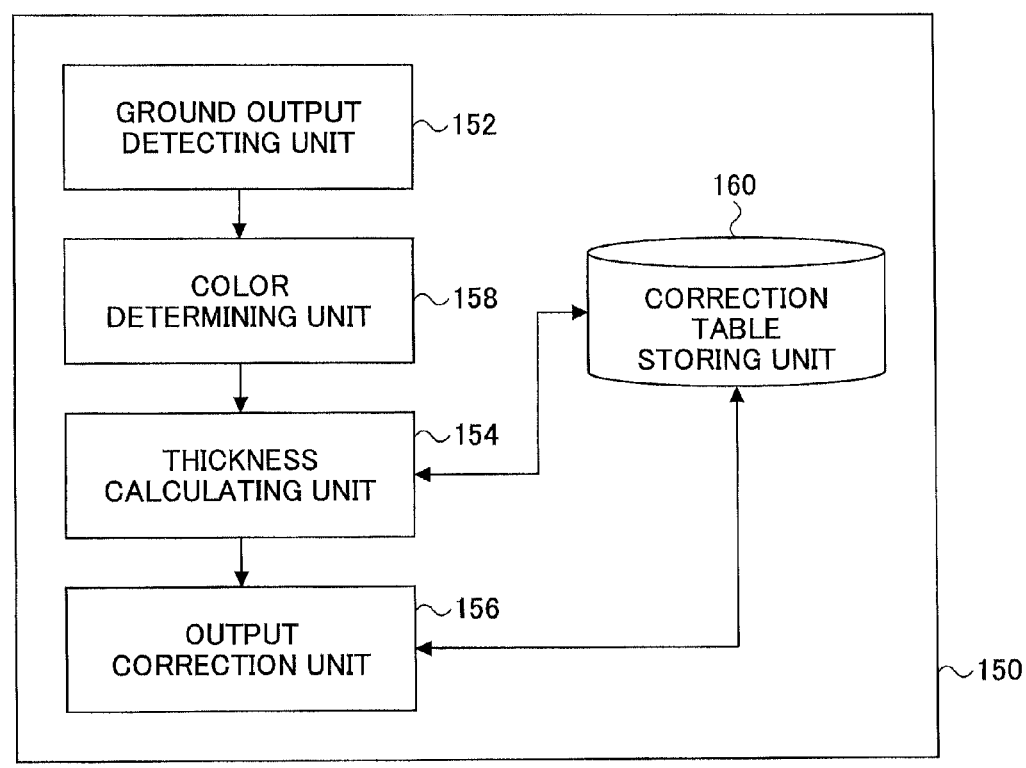
FIG. 21 is a block diagram showing a control unit.

FIG. 21 shows a block diagram of a control unit 150 that controls a function of the present embodiment. The control unit 150 may be composed of the controller unit 100 and the main body control unit 111. The control unit 150 includes a ground output detecting unit 152, a thickness calculating unit 154, an output correction unit 156, a color determining unit 158, and a correction table storing unit 160.

The first reading roller 19 serves to press the document at the first reading unit 20 so as not to float. The transferring guide 32 guides transferring by the first reading roller 19. Further, the transferring guide 32 also serves as a reference white member (a background member) for obtaining shading data (reference white data for a shading correction) for the first reading unit 20.

The second reading roller 26 presses the document so as not to float at the second reading unit 25. The second reading roller 26 also serves as a reference white member (a background member) for obtaining shading data for the second reading unit 25.

Instead of the above described first reading unit 20, a scanning type reading unit may be used. This embodiment will be explained later in detail.

Next, a main structure of control components of the second reading unit 25 as shown in FIG. 1 and FIG. 2 will be explained.

Figure 3:
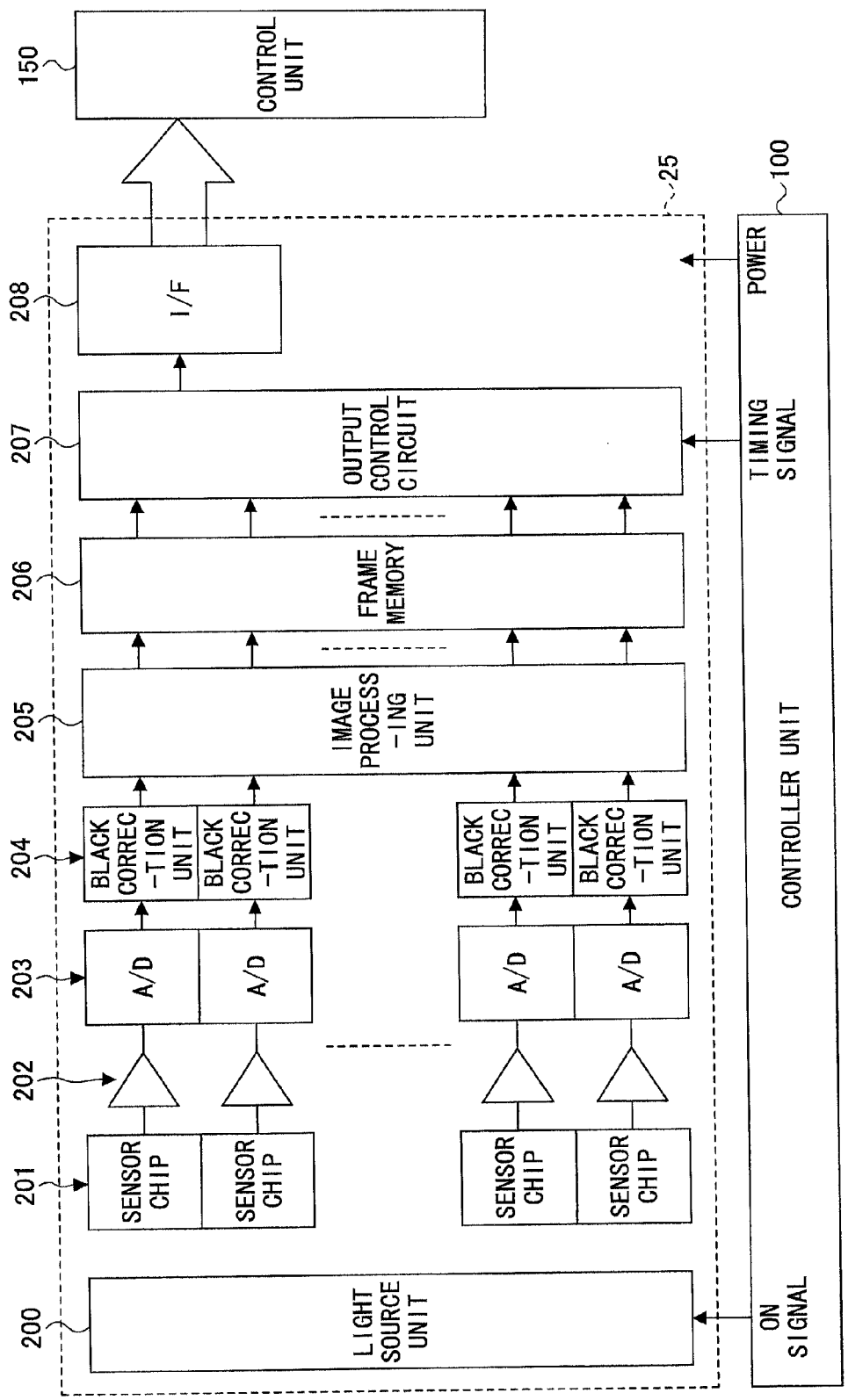
FIG. 3 is a block diagram showing an example of the main structure of the control components of the second reading unit of FIG. 1 and FIG. 2.

FIG. 3 is a block diagram showing an example of the main structure of the control components of the second reading unit 25. Although not shown, the first reading unit 20 has similar control components as those of the second reading unit 25.

In this embodiment, the second reading unit 25 is an image reading unit using a scanning method by a CIS (Contact Image Sensor). The second reading unit 25 includes a light source unit 200, plural sensor chips 201, plural amplifier circuits 202, plural A/D converters 203, plural black correction units 204, an image processing unit 205, a frame memory 206, an output control circuit 207 and an I/F circuit 208.

The light source unit 200 may be composed of an illumination element such as an LED array, a fluorescent tube, a cold cathode tube or the like.

The plural sensor IC chips (hereinafter simply referred to as a "sensor chip" as well) 201 are juxtaposed in the main scanning direction (corresponding to the width direction of the document). Each of the sensor chips 201 includes a photoelectric converter referred to as a contact image sensor and a condenser lens.

The amplifier circuits 202 are connected to the respective sensor chips 201. The A/D converters 203 are connected to the respective amplifier circuits 202.

Further, the black correction units 204 are connected to the respective A/D converters 203. As an output signal (digital image signal) output from each of the A/D converters 203 includes a black level offset in addition to a purposeful signal component, each of the plural black correction units 204 removes the black level offset included in the output signal from the respective A/D converter 203.

Prior to the timing when the document reaches the reading position of the second reading unit 25, signal indicating to illuminate (ON signal) is sent from an on signal controller unit 100 to the light source unit 200.

Then, the light source unit 200 is turned on and the light from the light source unit 200 is irradiated to the other side of the document while being scanned in the main scanning direction (line direction). The light reflected at the other side of the document is condensed onto the photoelectric converter by the condenser lens in each of the sensor chips 201 to be read as an analog image signal as a result of a photoelectric conversion of each line.

The analog image signal read at each of the sensor chips 201 is converted into a digital image signal (hereinafter simply referred tows "image data" as well) by the respective A/D converter 203 after being amplified by the respective amplifier circuit 202.

Each of the black correction units 204 performs an offset correction (a black level correction) to remove the offset components from the respective digital image signal. The digital image signals are then input to the image processing unit 205 where a shading correction or the like is performed. Then, the digital image signals are temporarily stored in the frame memory 206.

In the second reading unit 25, as the image processing unit 205 performs the shading correction as well, reference white data (shading data) for the shading correction may be generated by the components including the light source unit 200.

The digital image signals temporarily stored in the frame memory 206 are converted by the output control circuit 207 to be in a data format acceptable by the main body control unit 111 and then output to the control unit 150, composed of the controller unit 100 and the main body control unit 111 as shown in FIG. 21. Then, the correction as will be explained later is performed.

Further, the controller unit 100 may output timing signal that indicates the timing when the front edge of the document reaches the reading position of the second reading unit 25 (where the image data generated after the timing is treated as effective data), a signal for turning on the light source unit 200 (not shown in the drawings), a signal for providing power (shown as "POWER"), or the like.

Next, an example where a scanning type first reading unit provided below the stacking unit H reading unit is used instead of the first reading unit 20 of FIG. 1 will be explained. When the scanning type first reading unit is used, a transfer belt, although not shown, for transferring a document is provided below the stacking unit H.

Figure 4:
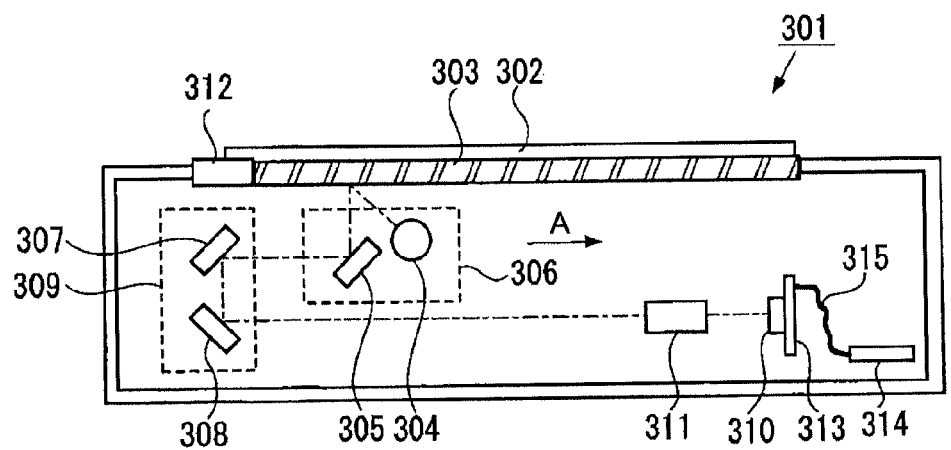
FIG. 4 is a front view of longitudinal cross section of a scanning type first reading unit used instead of the first reading unit of FIG. 1.

FIG. 4, is an example of a front view of longitudinal cross section of a first reading unit 301 provided instead of the first reading unit 20 of FIG. 1.

The scanning type first reading unit 301 includes a platen glass (contact glass) 303 which serves as a document glass on which a document 302 is mounted, a first carriage 306 composed of a light source unit 304 and a first reflection mirror 305 for exposing the document 302, a second carriage 309 composed of a second reflection mirror 306 and a third reflection mirror 308, a CCD (Charge Coupled Devices) 310 which serves as an image sensor, a lens unit 311 for transmitting light onto the CCD 310, and a reference white board (a reference white member, or a background member) 312 for a shading correction.

The scanning type first reading unit 301 further includes a sensor substrate 313 on which the CCD 310 is mounted, a signal processing substrate 314 on which a signal processing circuit (similar to the circuit of FIG. 3) is mounted to perform various signal processing on an image signal (read image data) output from the CCD 310, and a connection cable 315 connecting the sensor substrate 313 and the signal processing substrate 314.

The light source unit 304, the first reflection mirror 305, the second reflection mirror 307, the third reflection mirror 309, and the lens unit 311 compose a scanning optical system. As for the scanning optical system, provided that the document moves relative to the mirrors or the like, a type where the mirrors or the like are fixed and the document is to be moved may be alternatively used.

The light source unit 304 emits light on the reference white board 312 or a reading surface of the platen glass 303 at a predetermined angle. The light reflected at the reference white board 312 or the document 302 is received by the CCD 310 via the first reflection mirror 305, the second reflection mirror 306, the third reflection mirror 308, and the lens unit 311.

The CCD 310 outputs a voltage corresponding to received amount of light as an analog image signal.

The first carriage 306 and the second carriage 309 are driven by stepping motors, not shown in the drawings, to move in the sub scanning direction (the direction shown as an arrow A) while keeping the optical path length between the reading surface position of the document 302 and the CCD 310 at a certain value for scanning with the light irradiation.

Next, an incident light to be received by an image sensor of a reading unit will be explained. Here, a case where an incident light is received by the image sensor of the first reading unit 20 of FIG. 1 when an image on the document surface is read by the first reading unit 20 will be explained. As for the second reading unit 25, an incident light of an image on the other side of the document is received by the image sensor of the second reading unit 25 in accordance with the same mechanism as that for the first reading unit 20. Therefore, explanations of the same are not provided in this document.

Figure 5A:
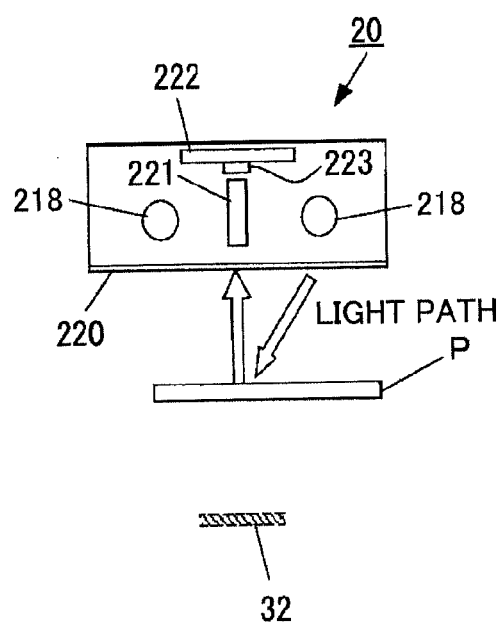
FIGS. 5A and 5B are drawings for explaining the light path when an image on a front surface of a document is read by the first reading unit of FIG. 1.
Figure 5B:
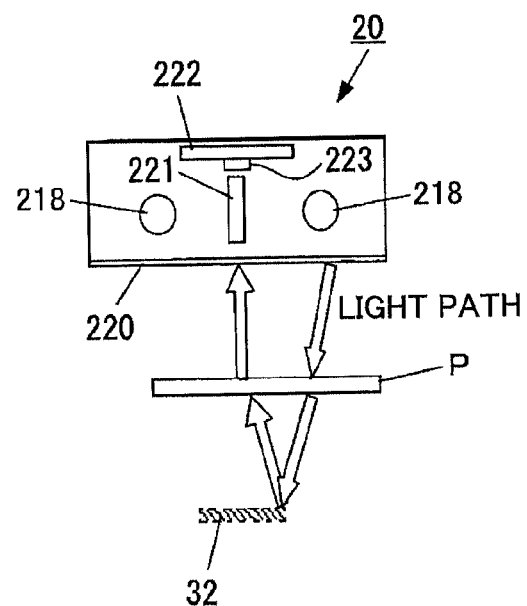

FIGS. 5A and 5B are explanatory views showing an incident light received by a sensor of the reading unit.

Here, for explanatory purposes, the positions of the first reading unit 20 and the transferring guide 32 in FIGS. 5A and 5B are opposite to those in FIG. 1.

The first reading unit 20 includes a glass 220, a light source unit 218, a SLA (Selfoc lens array) 221 which serves as a condenser lens, a sensor substrate 222, and an image sensor (photoelectric converter) 223 mounted on the sensor substrate 222.

In the first reading unit 20, the light from the light source unit 218 is irradiated onto the transferring guide 32 which serves as the background member, or a document P through the glass 220. The light source unit 218 of the first reading unit 20 may have a same structure and function as that of the light source unit 200 of the second reading unit 25 as described above with reference to FIG. 3.

The reflected light (diffused light) from the transferring guide 32 or the document P is received by the image sensor 223 via the SLA 221 to be converted to an analog image signal as a result of a photoelectric conversion.

The incident light received by the image sensor (hereinafter simply referred to as a "sensor" as well) 223 when the image on the document surface is read by the first reading unit 20 includes two kinds of reflected lights. One of which is a reflected light from the document P as shown in FIG. 5A, and the other of which is a reflected light from the transferring guide 32 that serves as the background member as shown in FIG. 5B.

When the document P is thick, the amount of light that passes through the document P decreases to reduce the influence of the reflected light from the transferring guide 32. When, on the other hand, the document P is thin, the amount of light that passes through the document P increases to increase the influence of the reflected light from the transferring guide 32.

Variation of RGB balance (output values of RGB components and ratios of RGB components) because of the influence of the background member will be explained in detail. Here, a case where the first reading unit 20 of FIG. 1 reads a ground of the front surface of the document and the second reading unit 25 of FIG. 1 reads a ground of the back surface of the document will be explained. Hereinafter, "R" indicates red, "G" indicates green, and "B" indicates blue.

Figure 6:
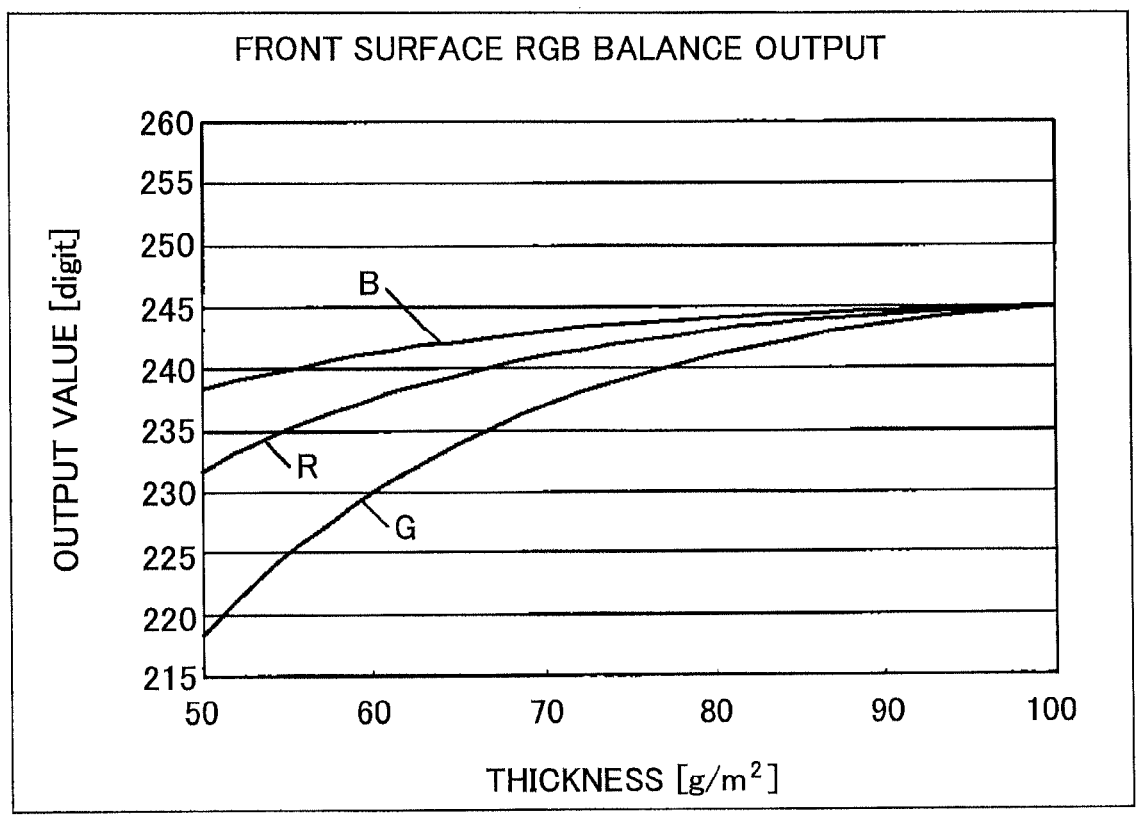
FIG. 6 is a graph showing a characteristic of output values of RGB components with respect to thicknesses of a document due to influence of background member when a front surface of the document is read.

FIG. 6 is a graph showing a characteristic of output values of RGB components (tone level of an RGB digital image signal) with respect to the thickness of the document due to the influence of the background member (transferring guide 32) when the front surface of the document is read, as the thickness of the document is varied.

Figure 7:
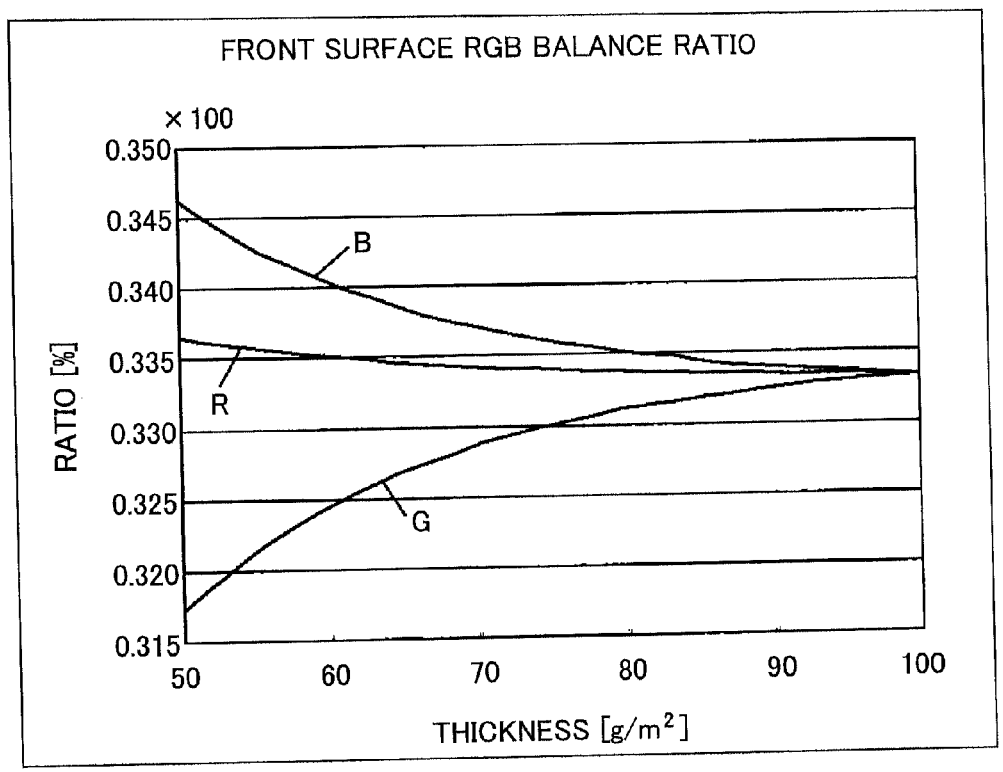
FIG. 7 is a graph showing a characteristic of ratios of RGB components with respect to the thicknesses of the document due to the influence of the background member when the front surface of the document is read.

FIG. 7 is a graph showing a characteristic of ratios of RGB components with respect to the thickness of the document due to the influence of the background member when the front surface of the document is read, as the thickness of the document is varied.

Figure 8:
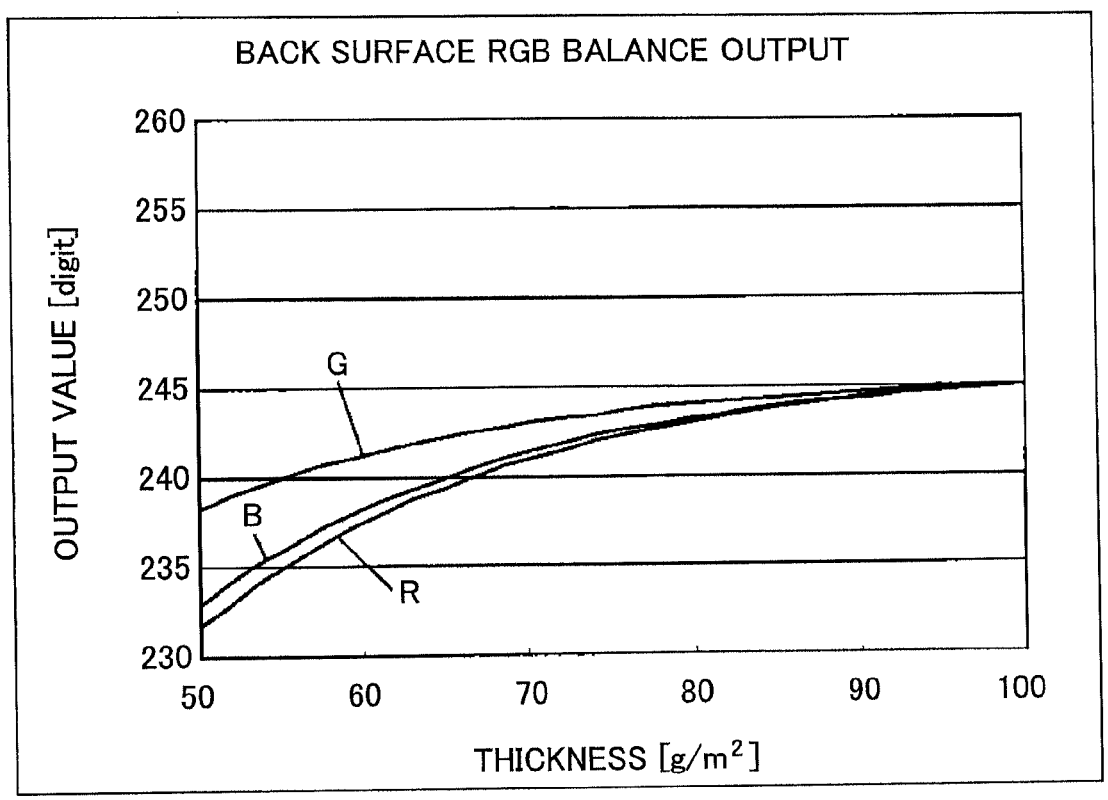
FIG. 8 is a graph showing a characteristic of output values of RGB components with respect to thicknesses of the document due to the influence of a background member when a back surface of the document is read.

FIG. 8 is a graph showing a characteristic of Output values of RGB components with respect to the thickness of the document due to the influence of the background member (second reading roller 26) when the back surface of the document is read, as the thickness of the document is varied.

Figure 9:
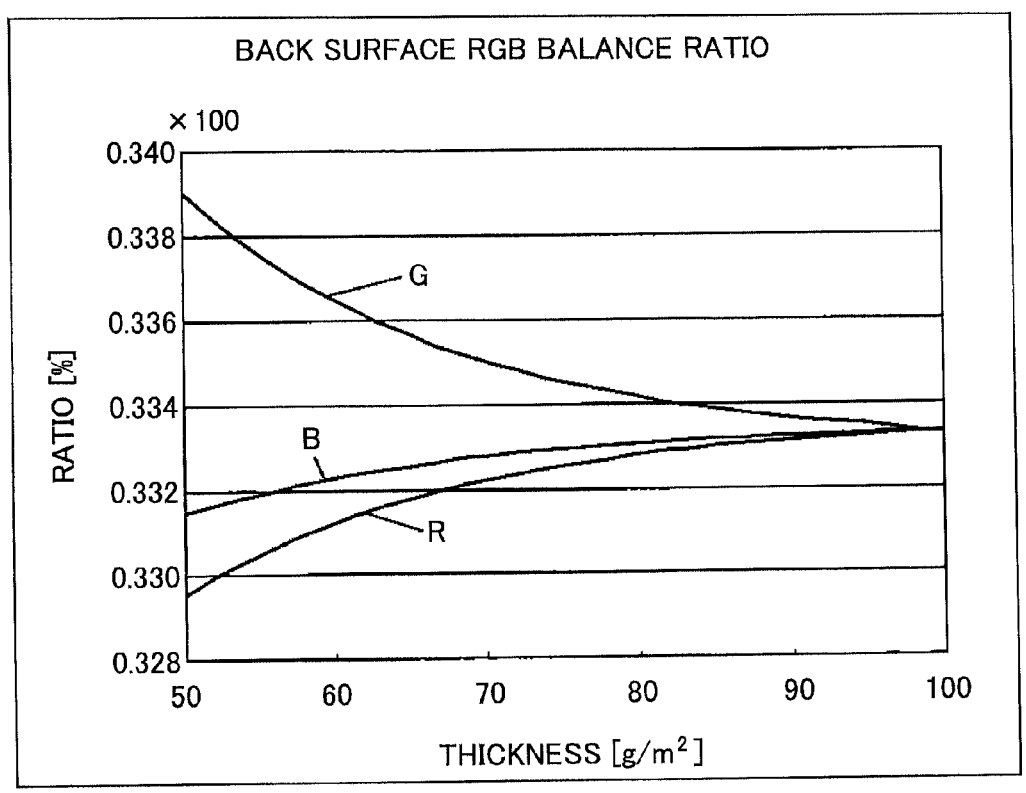
FIG. 9 is a graph showing a characteristic of ratios of RGB components with respect to thicknesses of the document due to the influence of the background member when the back surface of the document is read.

FIG. 9 is a graph showing a characteristic of ratios of RGB components with respect to the thickness of the document due to the influence of the background member when the back surface of the document is read, as the thickness of the document is varied.

In these examples, it is assumed that the background member (transferring guide 32) used for the first reading unit 20 that reads the front surface of the document has a color in which blue is strong while green is weak. It is assumed that the background member (second reading roller 26) used for the second reading unit 25 that reads the back surface of the document has a color in which green is strong while red is weak.

The ratio of red (R) shown in FIG. 7 and FIG. 9 can be calculated based on a following equation (1).

$$\text{ratio of red} = \text{output value of red}/(\text{output value of red} + \text{output value of green} + \text{output value of blue}) \quad (1)$$

The ratio of green and the ratio of blue can be calculated similar to that of red based on the equation (1).

As can be understood from FIG. 6 and FIG. 8, when the document is thin, the amount of the reflected light by the document decreases to decrease the output value. Further, when the document is thin, the reflected light by the background member is also input to the sensor and the output values for each of RGB differ due to the influence of the background member. This causes the change in ratios of RGB components as shown in FIG. 7 and FIG. 9. As shown in FIG. 7, when the document is as thick as 100 g/m$^2$, the ratios of RGB components are equal at 33.3%. However, when the document is as thin as 60 g/m$^2$, for example, the ratio of B component becomes the largest and the ratio of G component becomes the smallest. Therefore, the detected colors for the thick document and the thin document are different even when the same image is read as shown in FIG. 7 and FIG. 9. Especially for achromatic images, the difference becomes large.

Further, as the different background members are used for the first reading unit 20 and the second reading unit 25, the variation in ratios of RGB components differs for the first reading unit 20 and the second reading unit 25. It means that when the images of both sides of a thin document are read respectively by the first reading unit 20 and the second reading unit 25, the colors will be different.

In the present example, as explained above, the background member of the first reading unit 20 has the color in which blue is strong, and therefore, the thinner the document becomes, the higher the ratio of blue component becomes. The background member of the second reading unit 25 has the color in which green is strong, and therefore, the thinner the document becomes, the higher the ratio of green component becomes.

It means that even when the same printed image is read, colors of obtained images will change based on the thickness of a document on which the image is on and whether it is on a front surface or back surface. For example, even when an image obtained by reading a printed image on a thick document has no color, an image obtained by reading the printed image on a front surface of a thin document has a color in which blue is strong and an image obtained by reading the printed image on a back surface of the thin document has a color in which green is strong. This tendency of colors become stronger the thinner the document becomes.

The purpose of the image redder 110 of this embodiment is to prevent a generation of difference in shading between the images of the front surface and the back surface because of the influence of the background members. Therefore, a method of generating a correction table is explained.

Here as well, a case where the first reading unit 20 of FIG. 1 reads a front surface of the document and the second reading unit 25 of FIG. 1 reads a back surface of the document is explained.

The correction table may be formed by obtaining each output value when reading a front surface and a back surface of documents of the same kind with a variety of thicknesses, and calculating output ratios between the output values for the front surface and the back surface, as a reference. The thus obtained output values are stored in the correction table storing unit 160.

More in detail, the correction table storing unit 160 stores plural reference output ratios, where each ratio expresses a reference output ratio between a first reference ground output value for the first reading unit 20 and a second reference ground output value for the second reading unit 25 at a certain thickness of the document, with respect to various thicknesses of the document.

As for the following example, the thickness of the document is calculated by the output ratio of red component. In this example, the output values are corrected so that the output value for the document with thickness of 100 g/m$^2$ becomes 245 [digit].

Figure 10:
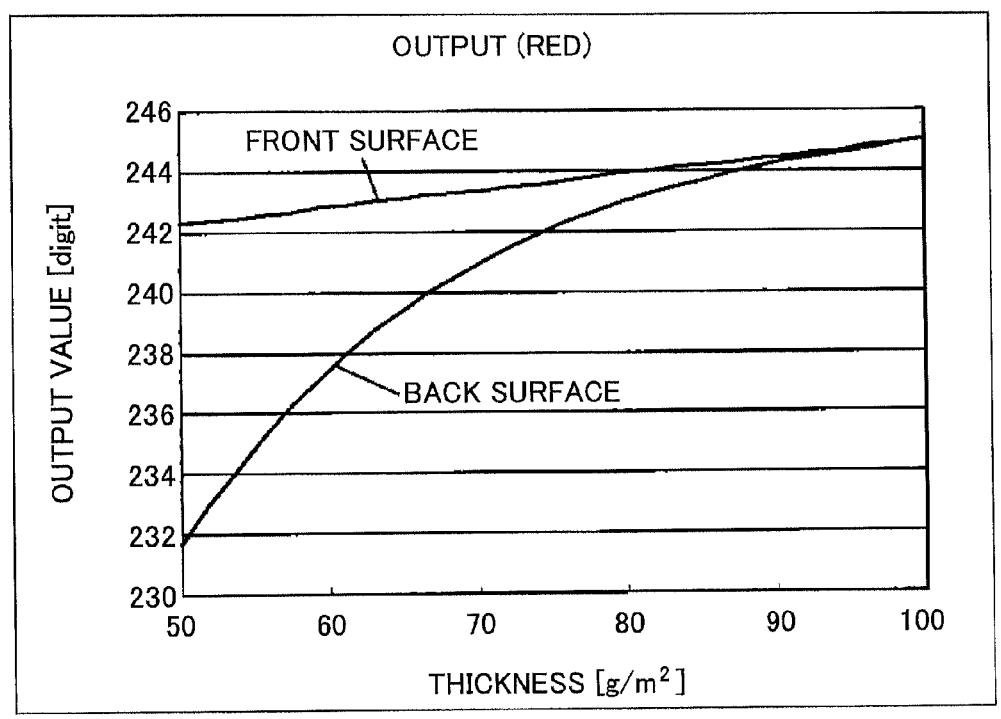
FIG. 10 is a graph showing a characteristic of output values of red (R) component of the front surface and the back surface with respect to the thicknesses of the document.

FIG. 10 is a graph showing a characteristic of output values of red (R) component of the front surface and the back surface with respect to the thickness of the document when thickness of the document of the same kind is varied.

Figure 11:
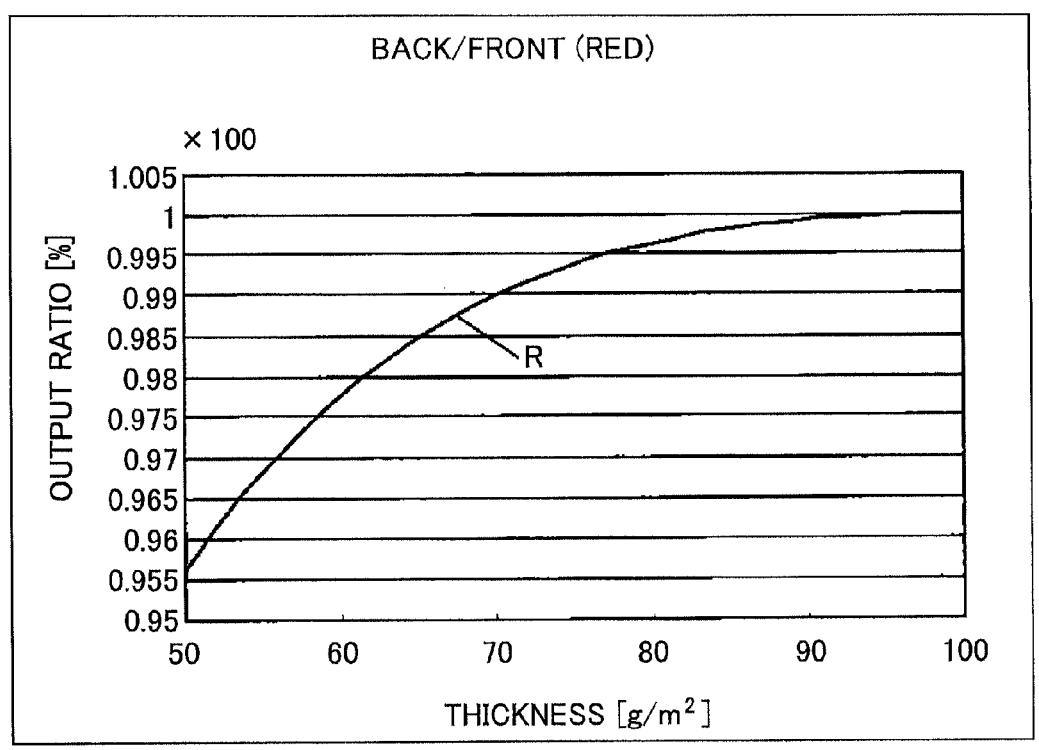
FIG. 11 is a graph showing a characteristic of an output ratio between the output value of the front surface and the output value of the back surface with respect to the thicknesses of the document.

FIG. 11 is a graph showing a characteristic of an output ratio between the output value of the front surface and the output value of the back surface with respect to thickness of the document when thickness of the document of the same kind is varied.

Figure 12:
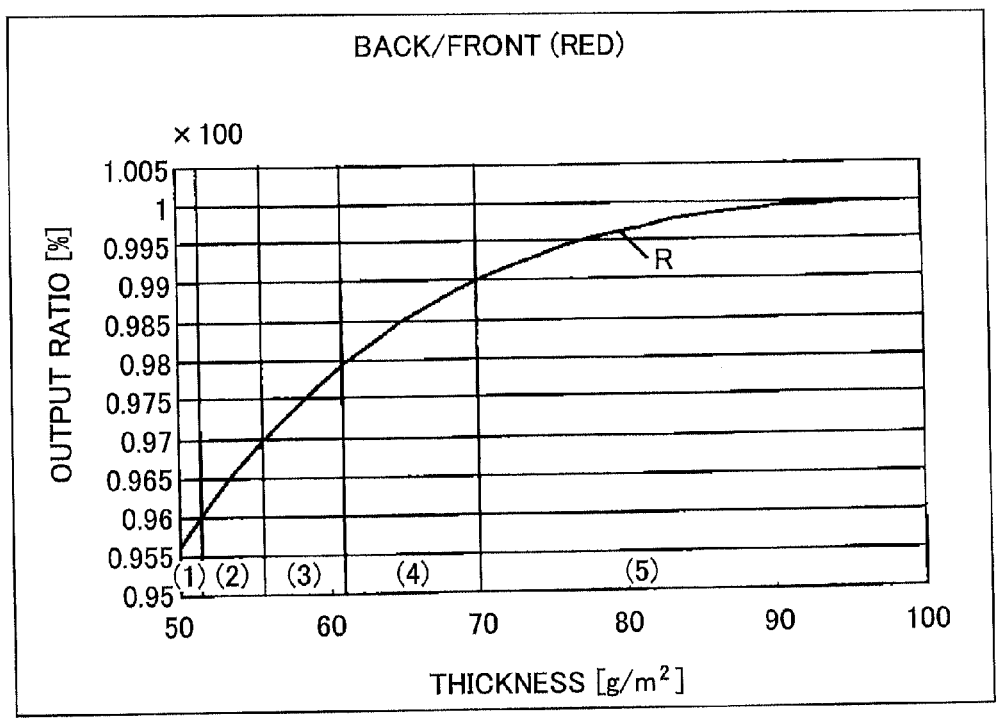
FIG. 12 is a graph for explaining how to generate a correction table based on the output ratio as shown in FIG. 11.

FIG. 12 is a graph for explaining how to generate a correction table based on the output ratio as shown in FIG. 11.

FIG. 13 is an example of a correction table.

When different background members are used for reading a front surface and a back surface of the document, as the document becomes thinner, the influence of the reflected lights by the background members becomes large to cause a variation in output values of the front surface and the back surface as shown in FIG. 10.

In other word, when the document becomes thinner, the amount of the light that passes through the document increases to reduce the output value. Further, the light that has passed through the document is reflected by the background member to give a different reflected light, based on the background member, to the sensor. Therefore, the output values vary depending on the background member.

As shown in FIG. 11, an output ratio between an output value of the front surface and an output value of the back surface (hereinafter simply referred to as "output ratio between front and back" as well) differs based on the thickness of the document. As for the case shown in FIG. 11, as the document becomes thinner, the rate between front and back decreases from one (100%).

In this example, the output ratio between front and back is calculated by dividing the output value of the back surface, the decreasing degree of the output values of the back surface when the document becomes thin being larger than that of the output values of the front surface, by the output value of the front surface. As for the opposite case, when the decreasing degree of the output values of the front surface is larger than that of the output values of the back surface, the output ratio between front and, back can be calculated by dividing the output value of the front surface by the output value of the back surface. For example, as for the case when calculating the output ratio between front and back of component green of shown in FIG. 6 and FIG. 8, the output ratio between front and back is calculated by dividing the output value of the front surface, the decreasing degree of the output values of the front surface when the document becomes thin being larger than that of the output values of the back surface, by the output value of the back surface. Although not shown, the correction table storing unit 160 stores the correction tables for G component and B component in addition to the correction table for R component. The correction table storing unit 160 may store the relationship that indicates which of the output values of the front surface and the back surface is used as a denominator and which one of them is used as a numerator.

At this time, a correction table as shown in FIG. 13 is generated from the relationship as shown in FIG. 12 in accordance with the output ratio between front and back. The correction table may be stored in the correction table storing unit 160 composed of a nonvolatile memory of the main body control unit 111 of FIG. 2. The correction table storing unit 160 may store information for the thickness to be used.

The correction table further includes correction factors with respect to thickness of the document. For example, as for the output ratio between front and back (just shown as "ratio" in FIGS. 11 to 13) between 96% to 97%, the thickness of the document is between 52 to 56 g/m$^2$, the correction factor for the front surface is α(2), and the correction factor for the back surface is β(2).

Therefore, for example, when the output ratio between front and back is 96.5%, the correction factor α(2) is applied to each pixel of the image data of the front surface while the correction factor β(2) is applied to each pixel of the image data of the back surface to correct the influence of the background members used when reading the document from the front surface and the back surface (reading operations by the first reading unit 20 and the second reading unit 25) in color.

It means that first, the thickness of the document is determined by the output ratio between front and back. Thereafter, the output values for entire front surface and entire back surface are corrected by the correction factors at the determined thickness to remove the influence of the background member so that the generation of difference in shading between the images of the front and back can be prevented.

Next, the method of calculating correction factors (with a correction table) will be explained.

FIG. 14 is a table showing a part of the values of the characteristic of ratios of RGB components corresponding to the graph shown in FIG. 7.

As for the case shown in FIG. 7, when the thickness of the document is 100 g/m$^2$, which is a thick document, the output values of RGB components become the same (the ratio for each color component becomes 33.3%).

The correction factors of a targeted color when reading a front surface of the document (front surface correction factor) can be calculated in accordance with a following equation (2).

$$\text{front surface correction factor of the targeted color} = \frac{\text{(ratio of the targeted color when the document is thick enough)}}{\text{(ratio of the targeted color of a used thickness)}} \quad (2)$$

For example, the front surface correction factor of red of a document having a thickness of 50 g/m$^2$ is obtained as follows in accordance with the equation (2) by referring to the table of FIG. 14. front surface correction factor (R)=33.3/33.7

The correction factors of a targeted color when reading a back surface of the document (back surface correction factor) can be calculated similar to that for the front surface in accordance with the equation (2) where the values of the back surface are used instead of those of the front surface.

The front correction factors and the back correction factors for various thicknesses are calculated based on the values obtained by reading the front surface and the back surface of the documents of the various thicknesses respectively by the first reading unit 20 and the second reading unit 25. Then, the calculated front correction factors and the back correction factors are stored in the correction table storing unit 160 composed of a nonvolatile memory in the main body control unit 111.

Then when reading a front surface and a back surface of a document, the thickness of the document is calculated based on the output values of the front surface and the back surface, the front surface correction factor and the back surface correction factor corresponding to the thickness are selected from the correction table storing unit 160, and then the corrected output values of the entire front surface and the entire back surface are corrected for each of the RGB components in accordance with a following equation (3).

(corrected output value for the targeted color)=(output value for the targeted color before correction)× (correction factor for the targeted color)   (3)

The equations (1), (2), and (3) may be stored in a storing unit composed of a nonvolatile memory of the main body control unit 111 of FIG. 2.

By correcting the output values of the entire front surface and the entire back surface in accordance with the equation (3), the variance (variance of the RGB balance) caused by the influence of the background members can be corrected and the generation of difference in shading between the images of the front and back because of the influence of the background members can be prevented.

Another example will be explained. Here, the correction factor may be calculated in accordance with another method using an approximation equation.

In the above examples with reference to FIG. 10 to FIG. 14, a method by which the output values of the front surface and the back surface are corrected by using the correction table is described. Alternatively, a method by which the output values of the front surface and the back surface of the document are linearly corrected by an approximation equation in accordance with the thickness of the document may be used. Such a method will be explained. Here, correcting output values of red will be explained as an example.

Figure 15:
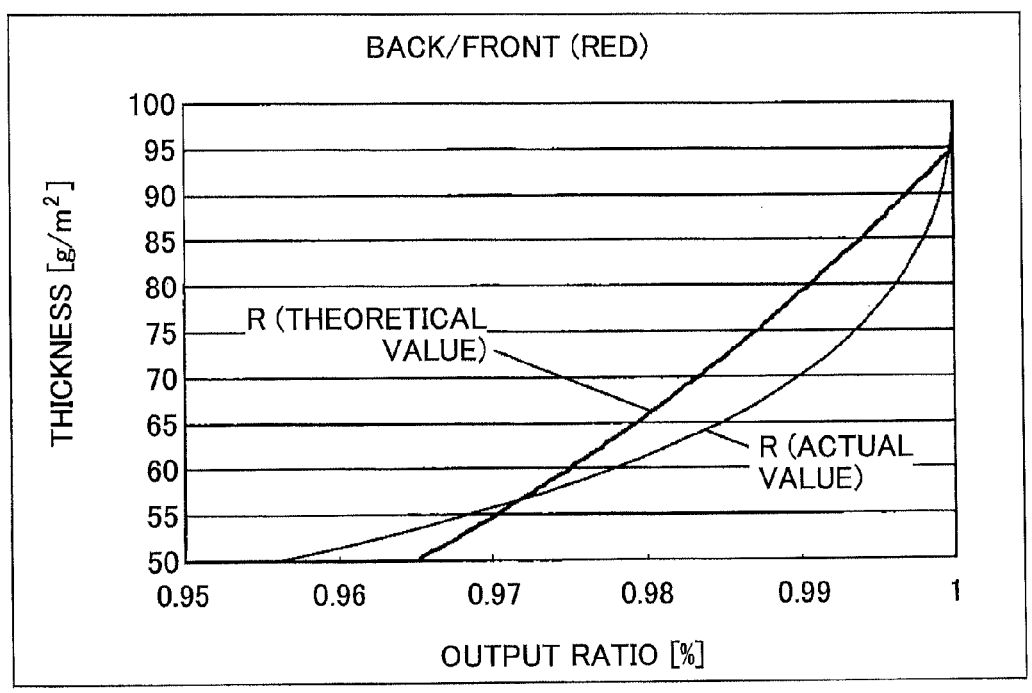
FIG. 15 is a graph showing a characteristic of the thicknesses of the document with respect to the output ratio between the output value of red of the front surface and the output value of red of the back surface.

FIG. 15 is a graph showing a characteristic of the thickness of the document to the output ratio between front and back of red.

This relationship corresponds to the relationship as shown in FIG. 11 where a characteristic of an output ratio between front and back of red with respect to thickness of the document when the thickness of the document of a same kind is varied. The fine line shows the value (actual value) the same as that described above when generating the correction table. The thick line shows a value (theoretical value) obtained by calculation in accordance with a following equation (4).

$$y = 10^{-06} e^{18.375x} \quad (4)$$

Here, "x" expresses the output ratio between front and back of red, and "y" expresses the thickness of the document.

Figure 16:
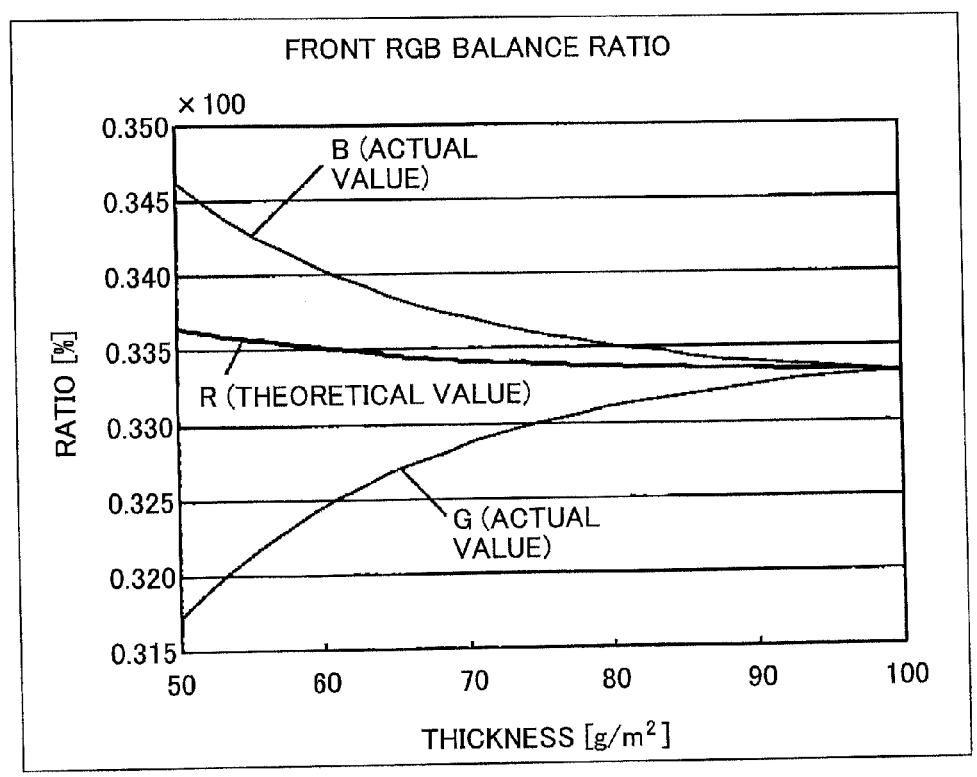
FIG. 16 is a graph corresponding to that shown in FIG. 7 where a characteristic of ratios of RGB components with respect to the thicknesses of the document due to the influence of the background member is shown.

FIG. 16 is a graph corresponding to that shown in FIG. 7 where a characteristic of ratios of RGB components with respect to the thickness of the document due to the influence of the background member when the front surface of the document is read, as the thickness of the document is varied is shown. Here in FIG. 16, the fine line expresses the ratios of green and blue, while the thin line expresses the theoretical value of red obtained by a calculation in accordance with the following equation (5).

$$y = -3 \times 10^{-08} x^3 + 8 \times 10^{-06} x^2 - 0.0007x + 0.3575 \quad (5)$$

Where "x" expresses the thickness of the document, and "y" expresses the ratio of red component among other components. The equations (4) and (5) may be stored in a storing unit composed of a nonvolatile memory of the main body control unit 111 of FIG. 2. The equations (4) and (5) may be generated by previously obtaining each output value when reading a front surface and a back surface of documents of a same kind with a variety of thicknesses, and calculating output ratio between the output values for the front surface and the back surface, as a reference.

When reading a front surface and a back surface of a document, an output ratio of red between front and back is calculated based on the output values of the front surface and the back surface (ground output values of red of the front surface and the back surface), and the thickness of the document is obtained in accordance with the equation (4). Then, the ratio of red among outputs of all colors is obtained in accordance with the equation (4), and then the correction factor for red can be obtained in accordance with the equation (2). Then, the output values of the entire front surface and the entire back surface are corrected in accordance with the equation (3).

An example of operations of detecting ground output (ground level) where the entire area of the document is used will be explained.

Figure 17:
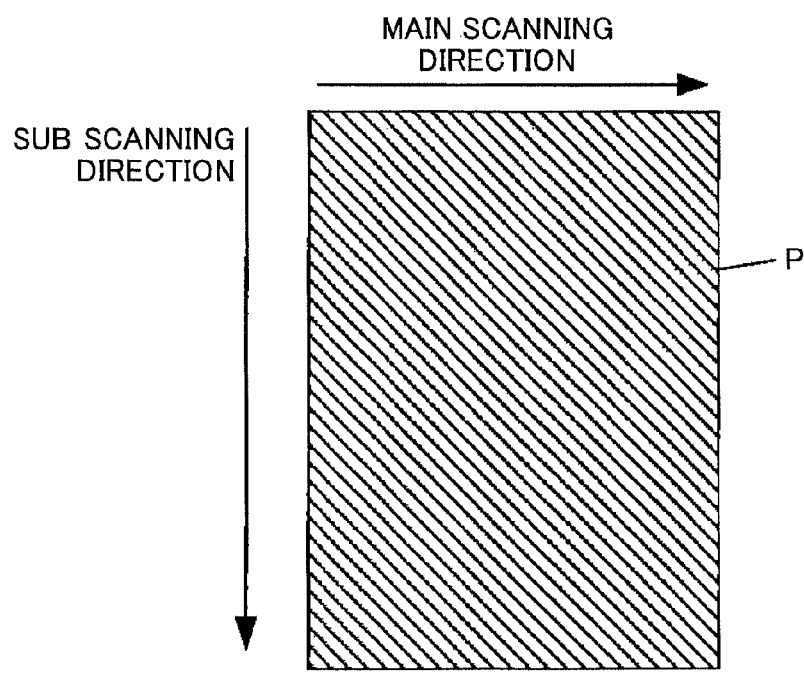
FIG. 17 is a drawing explaining a case when a ground output value is detected based on the output values of the entire of the document.

FIG. 17 is a drawing explaining a case when the ground output is detected based on the output values of the entire document. The hatched part (entirety) of the document P is a detected area for detecting the ground level.

The ground output detecting unit 152 of the controller unit 100 obtains ground output values of entire area of the document P, starting from a reading start line, in the entire main scanning direction and then in the entire sub scanning direction. Then, the ground output detecting unit 152 calculates an average value of ground output values (Ph values) of all of the lines for each RGB component as a ground level of the respective color. This method may be performed similarly as those of know techniques.

Another example of operations of detecting ground output (ground level) where a part (front edge of the document) of the document is used will be explained.

Figure 18:
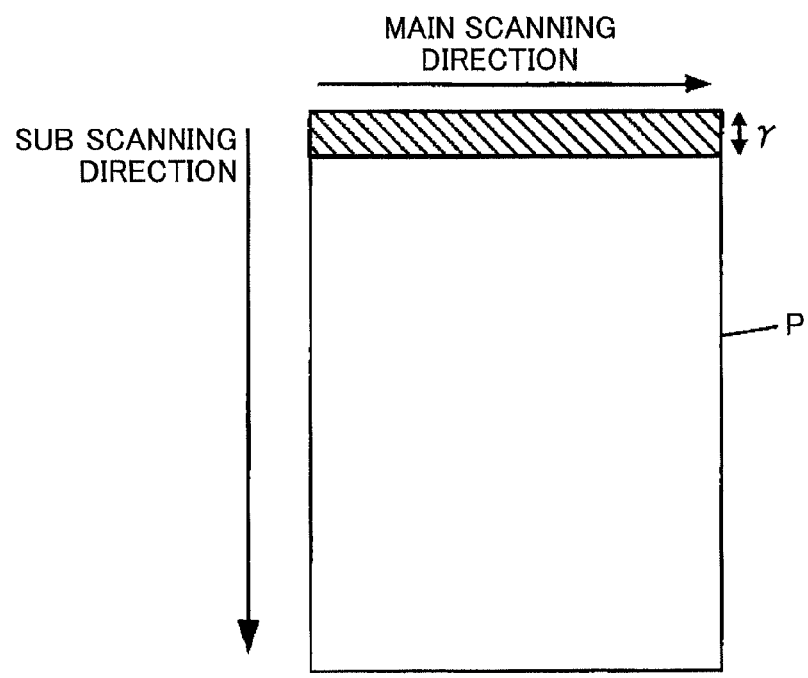
FIG. 18 is a drawing explaining a case when the ground output is detected based on the output values of a front edge part of the document.

FIG. 18 is a drawing explaining a case when the ground output is detected based on the output values of a part (a front edge part) of the document. The hatched part of the document P is a detected area for detecting the ground level.

The ground output detecting unit 152 of the controller unit 100 obtains ground output values of a part of the document P, starting from a reading start line, in the entire main scanning direction and then, from the front edge to the distance y in the sub scanning direction. Then, ground output detecting unit 152 calculates an average value of ground output values of the detected lines for each of RGB as a ground level of the respective color.

As for this example, the ground level can be detected by reading a space, from the edge within the distance γ, provided at the front edge area in the sub scanning direction of the document for presentation or the like. Further, using this example, compared with the case using the entire area of the document to detect the ground level, a memory capacity requirement can be reduced. This method may be performed similarly as those of know techniques.

Method of color conversion will be explained.

FIG. 19 is a table showing an example of correction table including color conversion matrixes corresponding to each of the correction factors.

The output correction unit 156 corrects the output values of the entire front surface and the entire back surface for RGB components obtained by reading the front surface and the back surface of the document by multiplying respective correction factors (front surface correction factors and back surface correction factors) selected based on the thickness of the document to the output values. By providing color conversion matrixes (front surface color conversion matrixes and back surface color conversion matrixes) and using the matrixes for correction, the correction of the output values can be more accurate.

Figure 20:
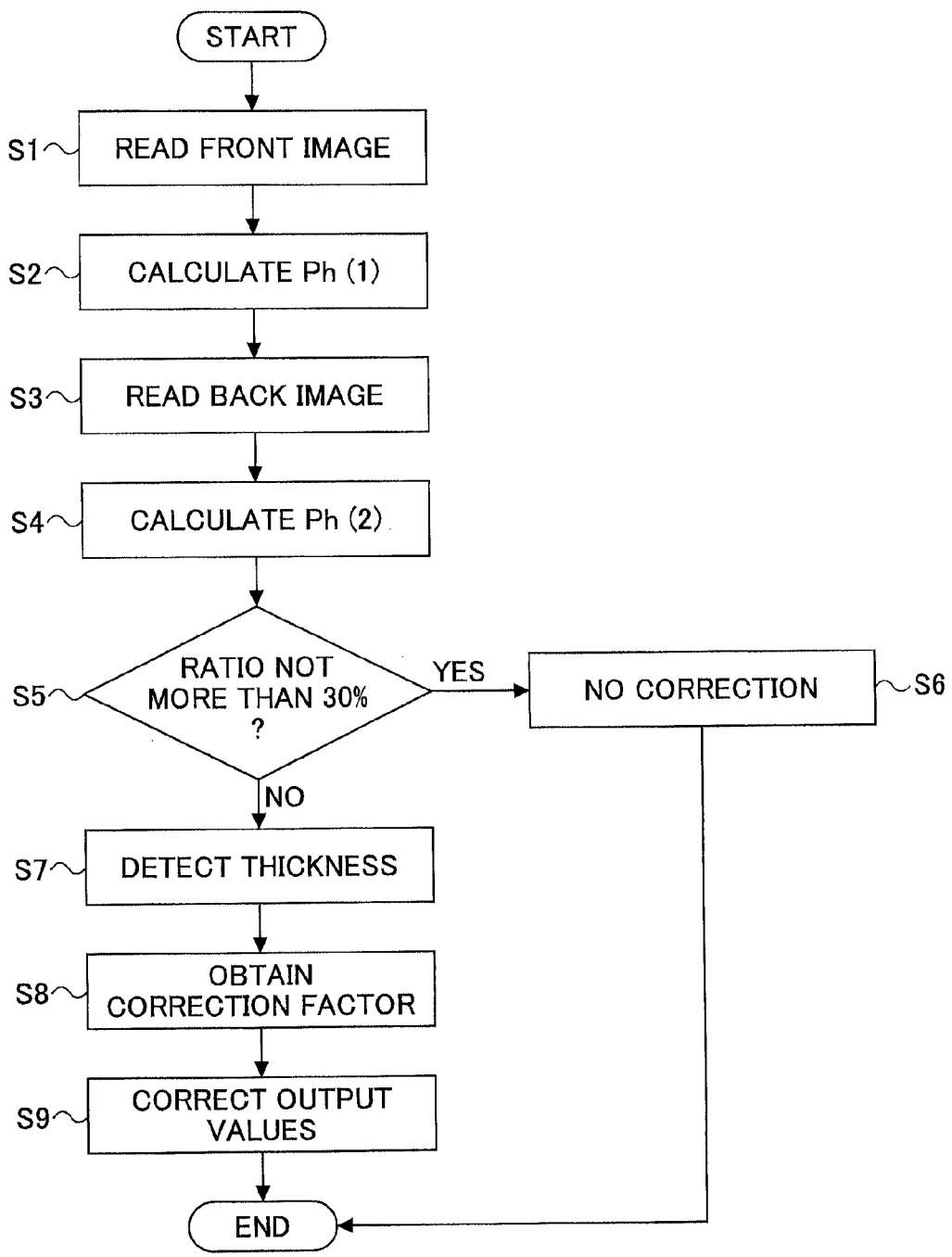
FIG. 20 is a flow chart showing an example of the operations in detail.

Operations of correcting the output values according to the image reader 110 of the embodiment will be explained with reference to a flowchart. FIG. 20 is a flow chart showing an example of the operations in detail.

The main body control unit 111 sets a duplex mode where images of both sides of a document (where images are printed on both sides) by a signal corresponding to an operation of a mode change key on the main body operation unit 108. Thereafter, the main body control unit 111 controls the controller unit 100 to start feeding a document as described above with reference to FIG. 1 by a signal corresponding to pushing a print key. At the same time, the following operations are started.

The main body control unit 111 controls the controller unit 100 to have the first reading unit 20 read a front surface of the document (S1). At this time, the ground output detecting unit 152 detects a ground level Ph (1) (a first ground output value) based on the output values by the first reading unit (S2).

Then, the main body control unit 111 controls the controller unit 100 to have the second reading unit 25 read a back surface of the document (S3). At this time, the ground output detecting unit 152 detects a ground level Ph (2) (a second ground output value) based on the output values by the second reading unit 25 (S2).

Subsequently, the color determining unit 158 calculates the ratios of RGB components (RGB balance) for the front surface and the back surface based on the detected Ph (1) and Ph (2) and determines whether there exist any color whose ratio is not more than a predetermined value, for example 30% in this case (S5). When there exists a color whose output ratio is not more than 30% (Y of S5), the color determining unit 158 determines that the document has a color and not to perform correction of this embodiment for the document (S6).

When there is not a color whose ratio is not more than 30% (N of S5), the thickness calculating unit 154 calculates the thickness of the document based on the output ratio of front and back for each of the RGB components in accordance with the relationship corresponding to that of the reference output ratio, respectively (S7).

Thereafter, the output correction unit 156 obtains the correction factors (front surface correction factors and back surface, correction factors) for each of RGB components corresponding to the calculated thickness calculated in step S7 (S8). The output correction unit 156 may read out the correction factors from the correction table storing unit 160 based on the calculated thickness.

Then, the output-correction unit 156 corrects the output values (a first output value and a second output value) of the entire front surface and the entire back surface of the document for each of RGB to give corrected output values (a first corrected value and a second corrected value) (S9).

As described above, the image reader of the embodiment, output values of the grounds of the front surface and the back surface of the document (object) by the first reading unit and the second reading unit, respectively, are detected as the ground output values. Then, the thickness of the document is calculated based on the output ratio between the ground output values of the front surface and the back surface. Thereafter, the output values of the entire front surface and the entire back surface of the document are corrected based on the calculated thickness. With this structure, a generation of difference in shading between the images of the front and back because of the influence of the background Members can be prevented.

The following merits can be obtained as well.

(1) The respective correction factors may be calculated in accordance with approximation equation (5) as described above, based on the calculated thickness of the document. By correcting the output values of the front image and the back image of the document by the first reading unit and the second reading unit, respectively, based on the calculated correction factors can reduce a memory capacity.

(2) By correcting the output values of the front image and the back image of the document by the first reading unit and the second reading unit, respectively, by previously providing a correction table including correction factors for different thicknesses possibly used for an object, reading out respective correction factors from the correction table based on the calculated thickness of the document, accurate correction can be performed.

(3) By providing plural correction tables corresponding to RGB components as the correction table and providing respective color conversion matrix to each of the correction table, color conversion can be performed more accuracy when correcting the output values of RGB.

(4) By detecting ground output values based on the output values of the entire document, the ground output values can be detected more accuracy.

(5) By detecting ground output values based on the part corresponding to the front edge of the document, memory capacity can be reduced.

(6) By determining the color of document based on the detected ground output values and deciding a document output ratio of any color for which is not more than a predetermined value as a document having a color and not to perform the correction, the operation can be efficiently performed.

Although in the above description, a case where the image reader has the function to correct the output values of the read document is explained, there is no limitation and this function may be provided on an image forming apparatus of a various kinds such as a copier, a facsimile machine, a printer or the like on which the image reader is mounted. With such a structure, the image forming apparatus itself may convert image data of R, G, B (or single colored image data) obtained from the image reader to image data for forming an image of yellow (Y), magenta (M), cyan (C), and black (K) (or single colored image data) and form an image on a recording medium such as a paper or the like as a visible image to obtain an image with a high quality.

As can be understood from the above description, according to the structure of the embodiment, a generation of difference in shading between the images of the front and back because of the influence of the background members can be prevented even when the background members of a different colors are used for the first reading unit and the second reading unit. Therefore, an image reader capable of preventing the generation of difference in shading can be provided. Further, an image forming apparatus capable of forming an image with a high quality can be provided.

According to the image reader of the embodiment, output values corresponding to the ground of the front surface and the back surface of the document among the output values of the first reading unit and the second reading unit are detected as the ground output, the thickness of the object is calculated based on the output ratio between the front surface and the back surface of the ground output, and the output values of the first reading unit and the second reading unit are corrected based on the calculated thickness so that a generation of difference in shading between the images of the front and back because of the influence of the background members can be prevented even when the background members of a different colors are used for the first reading unit and the second reading unit.

According to an image forming apparatus including such an image reader, image can be formed in accordance with the corrected digital image signals and an image with a high quality can be obtained.

The present invention is not limited to the specifically disclosed embodiments, and variations and modifications may be made without departing from the scope of the present invention.

The present application is based on Japanese Priority Application No. 2010-290536 filed on Dec. 27, 2010, the entire contents of which are hereby incorporated herein by reference.

What is claimed is:

1. An image reader comprising:
a first reading unit including a first background member, to read an image on a front surface of an object to be read placed on the first background member to output a first output value;
a second reading unit including a second background member to read an image on a back surface of the object placed on the second background member to output a second output value, the second background member being different from the first background member;
a ground output detecting unit to detect a first ground output value that expresses an output value for a ground part of the front surface based on the first output value output by the first reading unit and a second ground output value that expresses an output value for a ground part of the back surface based on the second output value output by the second reading unit;
a thickness calculating unit to calculate the thickness of the object based on an output ratio between the first ground output value and the second ground output value; and
an output correction unit to correct the first output value output by the first reading unit and the second output value output by the second reading unit based on the calculated thickness of the object, to output a corrected first output value and a corrected second output value, respectively,
wherein the output correction unit is used to calculate a first correction factor for the first output value and a second correction factor for the second output value based on the thickness of the object calculated by the thickness calculating unit, and to correct the first output value and the second output value based on the first correction factor and the second correction factor, respectively.

2. The image reader according to claim 1, wherein the first reading unit and the second reading unit are composed of different optical systems.

3. The image reader according to claim 1, wherein the first reading unit and the second reading unit are composed of same optical systems.

4. The image reader according to claim 1, further comprising a correction table storing unit that stores a correction table including plural first correction factors for the first output value with respect to various thicknesses of the object and second correction factors for the second output value with respect to various thicknesses of the object, and wherein the output correction unit reads out the respective first correction factor and the second correction factor from the correction table storing unit based on the calculated thickness and corrects the first output value and the second output value based on the first correction factor and the second correction factor, respectively.

5. The image reader according to claim 4, wherein the first output value and the second output value include plural color components, the correction table storing unit stores plural of the correction tables corresponding to the color components, and each of the plural correction tables includes a color conversion matrix.

6. The image reader according to claim 1, wherein the ground output detecting unit detects the first ground output value and the second ground output value based on the first output value and the second output value for the entire front surface of the object and the entire back surface of the object, respectively.

7. The image reader according to claim 1, wherein the ground output detecting unit detects the first ground output value and the second ground output value based on the first output value and the second output value for a front edge part of the front surface of the object and a front edge part of the back surface of the object, respectively.

8. The image reader according to claim 1, further comprising a color determining unit that determines a color of the object based on the first ground output value or the second ground output value detected by the ground output detecting unit.

9. The image reader according to claim 1, wherein the first output value and the second output value include color components of red, green and blue, and the thickness calculating unit calculates the thickness of the object based on the output ratio between the first ground output value and the second ground output value of at least one of the color components.

10. The image reader according to claim 1, further comprising a correction table storing unit that stores plural reference output ratios, each of which expresses the reference output ratio between a first reference ground output value for the first reading unit and a second reference ground output value for the second reading unit at a certain thickness of the object, with respect to various thicknesses of the object, wherein the thickness calculating unit calculates the thickness of the object based on the output ratio between the first ground output value and the second ground output value and the reference output ratio by referring to the correction table storing unit.

11. The image reader according to claim 1, further comprising a storing unit that stores an equation by which a thickness of the object can be calculated based on the output ratio between the first ground output value and the second ground output value, wherein the thickness calculating unit calculates the thickness of the object based on the output ratio between the first ground output value and the second ground output value by inputting the output ratio into the equation stored in the storing unit.

12. The image reader according to claim 1, wherein the second background member has a shading different from that of the first background member.

13. An image forming apparatus comprising the image reader according to claim 1, and forming an image based on the first corrected output value and the second corrected output value output from the image reader.

14. A method of correcting output values output from a first reading unit that includes a first background member and reads an image on a front surface of an object to be read placed on the first background member to output a first output value, and a second reading unit that includes a second background member and reads an image on a back surface of the object placed on the second background member to output a second output value, the second background member being different from the first background member, comprising:

detecting a first ground output value that expresses an output value for a ground part of the front surface based on the first output value output by the first reading unit and a second ground output value that expresses an output value for a ground part of the back surface based on the second output value output by the second reading unit;

calculating the thickness of the object based on the output ratio between the first ground output value and the second ground output value; and correcting the first output value output by the first reading unit and the second output value output by the second reading unit based on the calculated thickness of the object, to output a corrected first output value and a corrected second output value, respectively, wherein in the calculating of the thickness of the object, the thickness of the object is calculated by inputting the output ratio between the first ground output value and the second ground output value into an equation by which the thickness of the object can be calculated based on the output ratio between the first ground output value and the second ground output value stored in a storing unit.

15. The method of correcting output values according to claim 14, wherein in the calculating the thickness of the object, the thickness of the object is calculated based on the output ratio between the first ground output value and the second ground output value and plural reference output ratios, each of which expresses a reference output ratio between a first reference ground output value for the first reading unit and a second reference ground output value for the second reading unit at a certain thickness of the object, with respect to various thicknesses of the object stored in a correction table storing unit.

16. The method of correcting output values according to claim 14, wherein the second background member has a shading different from that of the first background member.

17. An image reader comprising:

a first reading means, including a first background member, for reading an image on a front surface of an object to be read placed on the first background member to output a first output value;

a second reading means, including a second background member, for reading an image on a back surface of the object placed on the second background member to output a second output value, the second background member being different from the first background member;

a ground output detecting means for detecting a first ground output value that expresses an output value for a ground part of the front surface based on the first output value output by the first reading means and a second ground output value that expresses an output value for a ground part of the back surface based on the second output value output by the second reading means;

a thickness calculating means for calculating the thickness of the object based on an output ratio between the first ground output value and the second ground output value;

an output correction means for correcting the first output value output by the first reading means and the second output value output by the second reading means based on the calculated thickness of the object, to output a corrected first output value and a corrected second output value, respectively; and a correction table storing means for storing a correction table including plural first correction factors for the first output value with respect to various thicknesses of the object and second correction factors for the second output value with respect to various thicknesses of the object, and wherein the output correction means reads out the respective first correction factor and the second correction factor from the correction table storing means based on the calculated thickness and corrects the first output value and the second output value based on the first correction factor and the second correction factor, respectively.

* * * * *